Patented Feb. 16, 1932

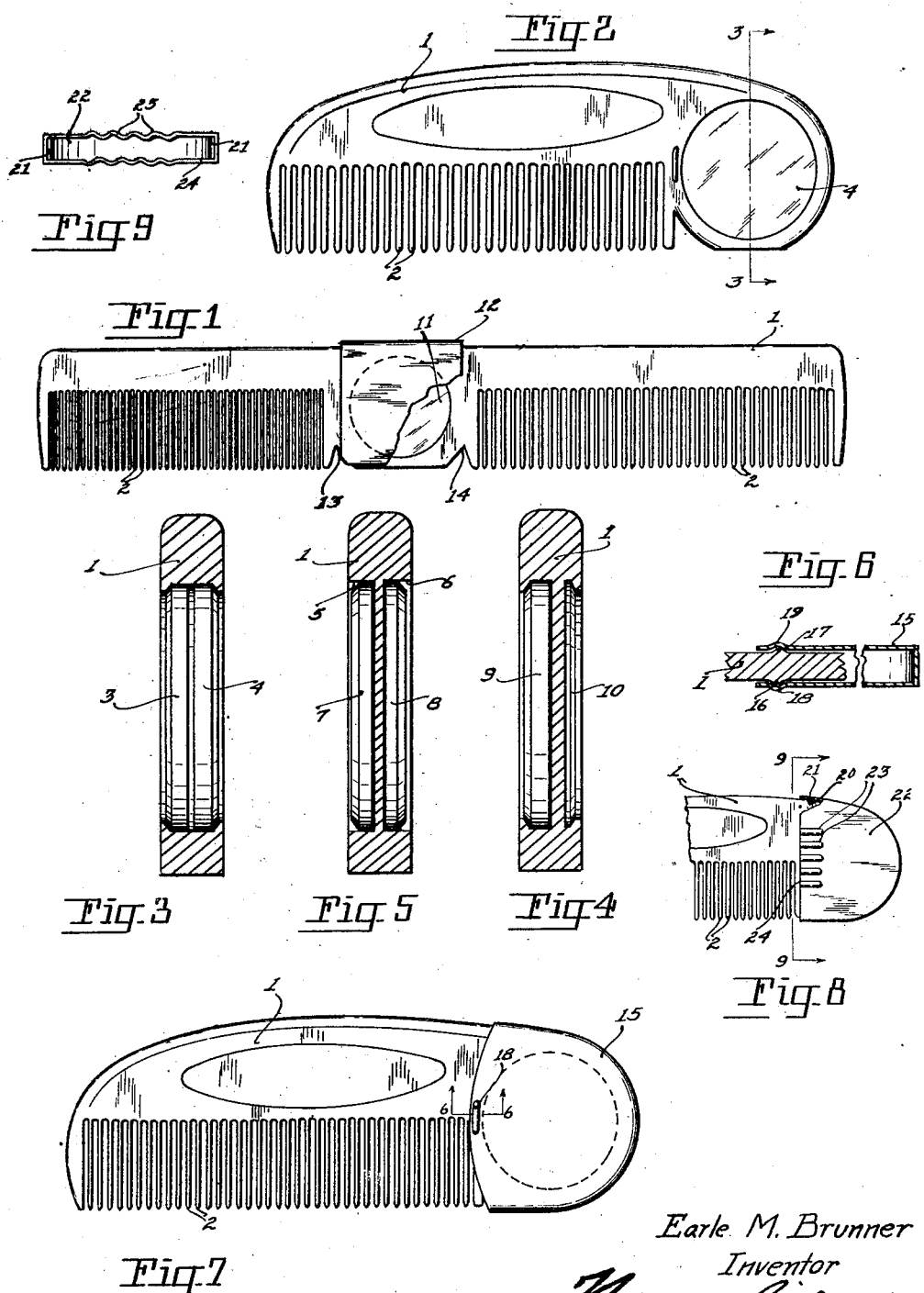

1,845,233

UNITED STATES PATENT OFFICE

EARLE M. BRUNNER, OF PORTLAND, OREGON, ASSIGNOR TO MODERN SPECIALTIES COMPANY, OF PORTLAND, OREGON, A CORPORATION OF OREGON

COMBINED COMB AND MIRROR

Application filed May 4, 1931. Serial No. 534,922.

My invention relates to improvements in combs of the pocket type. My invention is comprised of a hair comb body having one, or more recesses formed integral with the comb body, into which a mirror of glass, or metal, or other reflective surface may be placed, in order that the user of the comb may find the convenience of a mirror that is formed integral with the comb structure, the mirror being preferably placed at one end of the comb. A resilient shield member is provided for placement over the mirror and for protecting the same. The same being removably secured thereto and being adapted for being held in place by its strength.

The object of my invention is to provide a high-grade pocket comb having a mirror fixedly secured thereto, that will enable the user of the comb to have a mirror available for instant use for observing the results of the combing as the same progresses.

A further object of my invention consists in providing, in a single structure, a comb and mirror and providing means for the protection of the mirror and for the maintaining of the same in a satisfactory reflecting condition.

A further object of my invention consists in providing a combination comb and mirror, having a detachable shield for protecting the mirror when not in use.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 1 is a plan view of a combination coarse and fine toothed comb structure and having a mirror disposed within the comb structure and disposed between the fine and coarse teeth of the comb.

Fig. 2 is a plan view of a comb illustrating the mirror in one end of the comb.

Fig. 3 is a sectional end view of the mechanism illustrated in Fig. 2, the same being taken on line 3—3 of Fig. 2 looking in the direction indicated. In this view I have shown a mirror disposed on the oppositely disposed sides of the comb.

Fig. 4 is a sectional end view of the mechanism illustrated in Fig. 2 illustrating a single mirror that is formed and removably disposed within the body of the comb.

Fig. 5 is a sectional end view of a modified form of construction and illustrating the mirrors disposed within the comb body and being held therein by adhesive and frictional engagement.

Fig. 6 is a fragmentary, sectional, side view of the mechanism illustrated in Fig. 7 the same being taken on line 6—6 of Fig. 7, looking in the direction indicated.

Fig. 7 is a plan view of a comb, similar to that illustrated in Fig. 2 and illustrating a shield removably disposed upon the comb and adapted for protecting the mirror when being worn in the pocket, the shield being adapted for being held fixedly upon the comb but which may be removed by the application of pressure to the shield.

Fig. 8 is a fragmentary plan view of the mirror end of the comb and illustrating a shield disposed thereupon, with a part of the shield broken away, to illustrate a preferred form of securing the shield to the body of the comb.

Fig. 9 is an end view of the shield illustrated in Fig. 8, the same being taken on line 9—9 of Fig. 8, looking in the direction indicated. In this view the comb is not shown in section, it being an end view only of the open end of the shield.

Like reference characters refer to like parts throughout the several views.

1 is the comb body. 2 are the spaced teeth of the comb. Mirrors 3 and 4 may be formed integral with the comb body and be locked therein; the mirror being locked within the body element at the point of manufacture. The mirror may be placed within recesses 5 and 6 of the body element by precision methods of manufacture wherein the mirrors 7 and 8 are placed within the recesses and after which the same may be cemented, or otherwise fixedly maintained within the respective recesses. A mirror 9 may be placed within one side of the comb and a locket receptacle 10, be placed within the oppositely disposed sides of the comb, into which a picture of a loved one, or other desired articles may be placed therein. Both the mirror and the locket are formed integral with the body element of the comb at the point of manufacture of the comb and are fixedly, or removably secured relative to the body of the comb.

In an article of this kind it is found desirable to protect the mirror by a suitable shield structure where the mirror 11 is placed central of the body of the comb. A shield 12 is placed thereupon and is held in place by notches 13 and 14 within the body, into which the shield may be made to engage on its one side, the oppositely disposed side of the shield being made to lap over and engage the back of the comb and be held thereupon, due to the inherent tension formed within the shield at the time of the manufacture of the same, to facilitate its easy removal when removing pressure is applied, but which may be held upon the comb by frictional engagement.

Where the mirror is placed in the end, or adjacent the end of the body of the comb, a shield 15 is fitted to the comb and adapted for entirely covering the end of the comb and the mirror and the locket receptacle.

Projections 16 and 17 are formed upon the oppositely disposed sides of the body of the comb and recesses 18 and 19 are formed within the jacket member 15 so that when the jacket member is forced home upon the end of the comb the recess 18 may be made to register with the projections 16 and 17 and to lock the jacket upon the comb structure.

The construction may be made as illustrated in Fig. 9 and when so made a locking notch 20 is formed within one, or more edges of the comb and a locking projection 21 being formed within the jacket which is made to register with the recess.

In order to afford flexibility to the jacket 22 a plurality of corrugations 23 are formed within the jacket and adjacent the edges 24, of the jacket to give flexibility to the jacket and to compensate for the spread that will occur in making the projection engage within the recess. The inherent tension formed within the material from which the jacket is made automatically maintains the jacket upon the end of the comb to protect the mirror.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow:

What I claim is:

1. In a device of the class described, the combination of a comb comprised of one piece, recesses disposed in the oppositely disposed sides of one of the ends of the body element, a reflecting element removably disposed within the recesses, a shield placeable upon the end of the body element in which the reflecting elements are placed, and means for locking the shield relative to the body element.

2. In a device of the class described, the combination of a comb comprised of a body element of a single piece, a mirror secured to the body element, and a shield securable to the body element, and adapted for protecting the mirror, and means for locking the shield to the body element.

3. In a device of the class described, the combination of a comb, one, or more mirrors associated with the comb, and a shield securable to the body element, and over the mirror, and means for locking the shield relative to the body element.

EARLE M. BRUNNER.